May 5, 1925.
K. W. BARTLETT
LIQUID TREATING APPARATUS
Filed May 26, 1924.
1,536,059
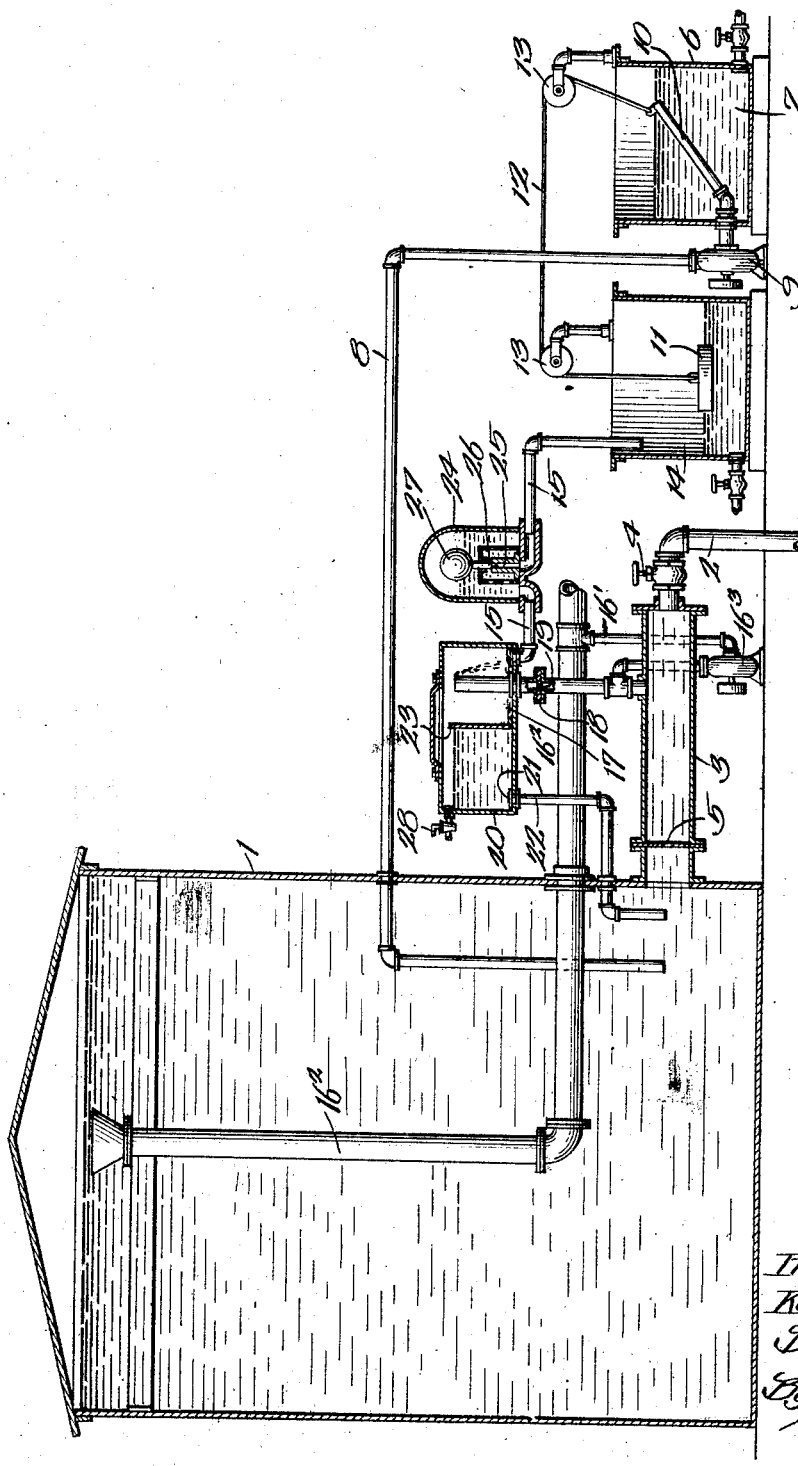
Inventor:
Kent W Bartlett Patented May 5, 1925.

1,536,059

UNITED STATES PATENT OFFICE.

KENT W. BARTLETT, OF HAMMOND, INDIANA.

LIQUID-TREATING APPARATUS.

Application filed May 26, 1924. Serial No. 715,994.

*To all whom it may concern:*

Be it known that I, KENT W. BARTLETT, a citizen of the United States, residing at Hammond, in the county of Lake and the State of Indiana, have invented a certain new and useful Improvement in Liquid-Treating Apparatus, of which the following is a full, clear, concise, and exact description.

My invention relates to liquid treating apparatus and is of particular service in softening water.

The invention has for its object the provision of improved means for controlling the mechanism which is employed for regulating the flow of chemical from the chemical source to the water that is to be softened or to the liquid that is to be treated.

In practicing my invention, piping is employed for supplying the water or other liquid that is to be treated to a settling or treatment tank, this piping having a constricted outlet discharging into the tank below its limiting level. A portion of the treated liquid controls the mechanism which governs the flow of chemical, this controlling liquid flowing through an orifice which is small in comparison with the aforesaid constricted outlet. Means are further employed which enable the back pressure of the liquid in the tank impressed at said outlet to produce a like pressure which is impressed at said orifice, this means being inclusive of an atmospheric or other gaseous medium interposed between said orifice and the liquid within the tank and through which this liquid exerts its pressure. In the preferred embodiment of the invention, the means for regulating the pressure, as stated, includes a receptacle having an inlet communicating with said tank upon the discharge side of the outlet, and a second receptacle communicating with the first through a passage that is above said inlet, there being sealed space in both receptacles placed in communication by said passage, in which space air or gas is trapped to constitute the medium through which the liquid exerts its pressure.

The invention will be more fully explained in connection with the accompanying drawing which is a view in section, somewhat diagrammatic, illustrating the preferred embodiment of the invention.

The treatment or settling tank 1 receives the water or other liquid that is to be treated through incoming piping 2, having an enlargement 3 adjacent the piping and desirably having a cut off valve 4. The liquid is discharged into the tank through an outlet 5 which is desirably constricted with respect to the bores of the piping 2 and its enlargement 3, the liquid being admitted to the tank near the bottom thereof. A source of chemical is illustrated in the form of a chemical tank 6 which holds the chemical 7, such as $Ca(OH)_2$ and $Na_2CO_3$, where water is being softened. Chemical from the source of chemical is supplied into the treatment tank 1 through piping 8, whose discharge end is located near the incoming raw liquid. The chemical is forced through pipe 8 by means of a pump 9 into which the chemical flows through the swinging pipe 10, mounted in the chemical tank 6. The position of this swinging pipe is governed by a float 11 that is connected with the pipe by means of a cable 12 passing over sheaves 13. The float tank 14, which contains the float 11, receives the fractional portion of the liquid which governs the flow of chemical into the treatment tank, through piping 15, 16. The latter piping extends into a, preferably, stationary receptacle 17 and terminates near the top of this receptacle. The piping 15 communicates with the receptacle 17 near the bottom thereof. In the embodiment of the invention shown, the piping 16 receives liquid from the piping 16' leading from the soft water outlet pipe $16^2$. The piping 16 also communicates with the pipe portion 3 to be subject to the pressure of the water in this pipe portion. A pump $16^3$ pumps treated water from the tank 1 through the piping 16' at a greater pressure at the pipe 16 than that exerted by the water in the pipe portion 3, so that the raw water will not pass upwardly into the tank 17, whereby deposit will be prevented from forming in the pipe 16. There is a partition 18 in piping 16, having a single orifice 19 which is small in comparison with the outlet opening 5.

In order that the back pressure impressed at the discharge side of the outlet 5 may be accompanied by a like pressure at the orifice 19, another, preferably, stationary receptacle 20 is employed which has an inlet 21 at its bottom through which liquid is admitted from the settling tank by way of piping 22. The two receptacles may, if preferred, be formed of a single box having an upright partition 23 which divides the box into the two receptacles, but this partition terminates short of the top of the box to afford the passage establishing communication between the upper portions of the receptacles which are sealed to trap a body of air or other gas. The piping 15 has a trap 24 connected therein in which the controlling liquid is first admitted from the receptacle 17 and from which the flow of this liquid is continued to the float tank 14. The liquid issues from the trap 24 through a port 25 having a valve 26 which is governed by a float 27 riding upon the liquid in the trap.

The level of the liquid within the receptacle 20 varies slightly with the head afforded by the liquid in the treatment tank but does not rise sufficiently to overflow the partition 23, so that the only liquid which flows into the float tank 14 to govern the supply of chemical is furnished through the piping 16. The apparatus included in and between the piping 15, 16 and 22 serves to produce or afford a pressure impressed at the orifice 19, which is equal to the back pressure impressed at the discharge side of the outlet 5, the air or gas trapped at the top of the receptacles 17 and 20 and the top of the trap 24 taking part in performing this function. An air vent valve 28 may be employed to establish communication with the external air in adjusting the apparatus for operation.

Changes may be made without departing from my invention.

Having thus described my invention, I claim:—

1. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank, said tank discharging controlling treated liquid from it to said mechanism through an orifice small in comparison with the aforesaid outlet of the piping; and means enabling the back pressure of the liquid in the tank impressed at said outlet to produce a like pressure impressed at said orifice and inclusive of a gaseous medium interposed between said orifice and the liquid within the tank and through which orifice this liquid exerts its pressure.

2. In a liquid treating apparatus, the combination with a tank for receiving the liquid to be treated; piping for supplying liquid to be treated and having a constructed outlet discharging into the tank below its limiting level; a source of chemical in communication with said tank; liquid controlled mechanism for regulating the flow of chemical from said source to said tank; means for discharging controlling treated liquid from said tank to said mechanism through an orifice small in comparison with the aforesaid outlet of the piping; and means enabling the back pressure of the liquid in the tank impressed at said outlet to produce a like pressure impressed at said orifice and inclusive of a gaseous medium interposed between said orifice and the liquid within the tank and through which orifice this liquid exerts its pressure.

3. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a receptacle having an inlet communicating with the tank upon the discharge side of said outlet; a second receptable communicating with the first through a passage that is above said inlet, there being sealed gas holding space in each receptacle placed in communication with the gas holding space in the other by said passage, there also being an orifice, small in comparison to said outlet, through which controlling treated liquid is discharged from said tank into the second receptacle; and a trap receiving liquid from the second receptacle and discharging the liquid to the liquid controlled mechanism to control the same.

4. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a stationary receptacle having an inlet communicating with the tank upon the discharge side of said outlet; a second stationary receptacle communicating with the first through a passage that is above said inlet, there being sealed gas holding space in each receptacle placed in communication with the gas holding space in the other by said passage, there also being an orifice, small in comparison to said outlet, through which controlling treated liquid is discharged into the second receptacle; and a trap receiving liquid from the second receptacle and discharging the liquid to the liquid controlled mechanism to control the same.

5. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a stationary receptacle having an inlet communicating with the tank upon the discharge side of said outlet; a second stationary receptacle communicating with the first through a passage that is above said inlet, there being sealed gas holding space in each receptacle placed in communication with the gas holding space in the other by said passage, there also being an orifice, small in comparison to said outlet, through which controlling treated liquid is discharged from said tank into the second receptacle; and a trap receiving liquid from the second receptacle and discharging the liquid to the liquid controlled mechanism to control the same.

6. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a stationary receptacle having an inlet communicating with the tank upon the discharge side of said outlet; a second receptacle communicating with the first through a passage that is above said inlet, there being sealed gas holding space in each receptacle placed in communication with the gas holding space in the other by said passage, there also being an orifice, small in comparison to said outlet, through which controlling treated liquid is discharged into the second receptacle; and a trap receiving liquid from the second receptacle and discharging the liquid to the liquid controlled mechanism to control the same.

7. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a receptacle having an inlet communicating with the tank upon the discharge side of said outlet; a second receptacle communicating with the first through a passage that is above said inlet, there being sealed gas holding space in each receptacle placed in communication with the gas holding space in the other by said passage, there also being an orifice, small in comparison to said outlet, through which controlling treated liquid is discharged from said tank into the second receptacle; and a trap receiving liquid from the second receptacle and discharging the liquid to the liquid controlled mechanism to control the same; said orifice being also in communication with said piping and subject to the pressure of the liquid in the piping that is opposite to but less than the pressure impressed by the treated liquid at the orifice.

8. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a stationary receptacle having an inlet communicating with the tank upon the discharge side of said outlet; a second receptacle communicating with the first through a passage that is above said inlet, there being sealed gas holding space in each receptacle placed in communication with the gas holding space in the other by said passage there also being an orifice, small in comparison to said outlet, through which controlling treated liquid is discharged into the second receptacle; and a trap receiving liquid from the second receptacle and discharging the liquid to the liquid controlled mechanism to control the same; said orifice being also in communication with said piping and subject to the pressure of the liquid in the piping that is opposite to but less than the pressure impressed by the treated liquid at the orifice.

9. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a stationary receptacle having an inlet communicating with the tank upon the discharge side of said outlet; a second stationary receptacle communicating with the first through a passage that is above said inlet, there being sealed gas holding space in each receptacle placed in communication with the gas holding space in the other by said passage, there also being an orifice, small in comparison to said outlet, through which controlling treated liquid is discharged from said tank into the second receptacle; and a trap receiving liquid from the second receptacle and discharging the liquid to the liquid controlled mechanism to control the same, said orifice being also in communication with said piping and subject to the pressure of the liquid in the piping that is opposite to but less than the pressure impressed by the treated liquid at the orifice.

10. In a liquid treating apparatus, the combination with a tank for receiving liquid to be treated; piping for supplying liquid to be treated and having a constricted outlet discharging into the tank below its limiting level; a source of chemical in communication with said tank; liquid controlled mechanism for regulating the flow of chemical from said source to said tank; a stationary receptacle having an inlet communicating with the tank upon the discharge side of said outlet; a second receptacle communicating with the first through a passage that is above said inlet, there being sealed gas holding space in each receptacle placed in communication with the gas holding space in the other by said passage, there also being an orifice, small in comparison to said outlet, through which controlling treated liquid is discharged into the second receptacle; and a trap receiving liquid from the second receptacle and discharging the liquid to the liquid controlled mechanism to control the same, said orifice being also in communication with said piping and subject to the pressure of the liquid in the piping that is opposite to but less than the pressure impressed by the treated liquid at the orifice.

In witness whereof, I hereunto subscribe my name.

KENT W. BARTLETT.